United States Patent
Zafiroglu et al.

(10) Patent No.: US 10,713,675 B2
(45) Date of Patent: Jul. 14, 2020

(54) SYSTEMS AND METHODS FOR GENERATION OF INCENTIVE OFFERS FOR ON-ROAD USERS

(71) Applicants: Alexandra C. Zafiroglu, Portland, OR (US); Jennifer A. Healey, San Jose, CA (US); Tim Plowman, Berkeley, CA (US); Victoria S. Fang, Mountain View, CA (US); Philip J. Corriveau, Forest Grove, OR (US)

(72) Inventors: Alexandra C. Zafiroglu, Portland, OR (US); Jennifer A. Healey, San Jose, CA (US); Tim Plowman, Berkeley, CA (US); Victoria S. Fang, Mountain View, CA (US); Philip J. Corriveau, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 748 days.

(21) Appl. No.: 13/631,850

(22) Filed: Sep. 28, 2012

(65) Prior Publication Data
US 2014/0095272 A1 Apr. 3, 2014

(51) Int. Cl.
G06Q 30/02 (2012.01)
G07B 15/06 (2011.01)
(Continued)

(52) U.S. Cl.
CPC ....... *G06Q 30/0207* (2013.01); *G06Q 20/322* (2013.01); *G06Q 20/387* (2013.01); *G07B 15/063* (2013.01)

(58) Field of Classification Search
CPC .... G06Q 30/02; G06Q 30/0259; G06Q 50/30; G06Q 30/0207; G06Q 20/322; G06Q 20/387; G07B 15/063
(Continued)

(56) References Cited

U.S. PATENT DOCUMENTS

| 5,305,197 A | 4/1994 | Axler et al. |
| 2002/0007306 A1* | 1/2002 | Granger ............. G06Q 30/0255 705/14.55 |

(Continued)

FOREIGN PATENT DOCUMENTS

| CN | 2752862 | 1/2006 |
| CN | 102509365 | 6/2012 |

(Continued)

OTHER PUBLICATIONS

Blumberg et al., Congestion Pricing That Preserves Driver Privacy, 2006 IEEE Intelligent Transportation Systems Conference, Toronto, Ont., 2006, pp. 725-732. (Year: 2006).*

(Continued)

*Primary Examiner* — Rupangini Singh
(74) *Attorney, Agent, or Firm* — Eversheds Sutherland US LLP

(57) ABSTRACT

Systems and methods for generating incentive offers for road use are provider. Incentive offers may be generated by a service provider server. The incentive offers may be generated identifying, by the computer having at least one processor, at least one use-condition associated with a transit point based at least in part on historical transit data. The generating the incentive offers may include generating one or more offers for a plurality of toll collections passes configured to enable the at least one use-condition associated with the transit point. Further, the method may provide for facilitating a distribution for the one or more incentive offers to a use group.

25 Claims, 7 Drawing Sheets

(51) Int. Cl.
*G06Q 20/32* (2012.01)
*G06Q 20/38* (2012.01)

(58) Field of Classification Search
USPC .................................................. 705/13, 14 X
See application file for complete search history.

(56) References Cited

U.S. PATENT DOCUMENTS

| | | |
|---|---|---|
| 2003/0093667 A1 | 5/2003 | Dutta |
| 2004/0119609 A1* | 6/2004 | Solomon ................ G07B 15/02 340/928 |
| 2007/0050248 A1* | 3/2007 | Huang ............... G06Q 30/0265 705/14.62 |
| 2007/0156513 A1* | 7/2007 | Mastrianni ............ G06Q 30/02 705/14.11 |
| 2007/0278300 A1* | 12/2007 | Dawson ................ G07B 15/06 235/384 |
| 2009/0018902 A1* | 1/2009 | Miller .................... G06Q 50/30 705/13 |
| 2009/0222338 A1* | 9/2009 | Hamilton, II .......... G06Q 30/02 705/14.1 |
| 2009/0295599 A1* | 12/2009 | Coffee ................. G08G 1/0104 340/928 |
| 2010/0036772 A1* | 2/2010 | Arceneaux ........... G06Q 20/045 705/50 |
| 2010/0153125 A1* | 6/2010 | Hamilton, II .......... G06Q 50/30 705/1.1 |
| 2010/0228574 A1* | 9/2010 | Mundinger .......... G06Q 10/047 705/4 |
| 2011/0015934 A1* | 1/2011 | Rowe .................... G06Q 30/02 705/1.1 |
| 2011/0087399 A1* | 4/2011 | Hyde ..................... G06Q 30/02 701/29.6 |
| 2011/0178861 A1* | 7/2011 | Georgi ............... G06Q 30/0224 705/14.25 |
| 2011/0208646 A1* | 8/2011 | McMaster ............. G06Q 30/02 705/39 |
| 2012/0226434 A1* | 9/2012 | Chiu .................... G08G 1/0112 701/117 |
| 2013/0013413 A1* | 1/2013 | McDaniel .......... G06Q 30/0241 705/14.64 |
| 2013/0191190 A1* | 7/2013 | Mandel ................ G07B 15/00 705/13 |
| 2014/0039988 A1* | 2/2014 | Londergan ......... G06Q 30/0207 705/14.1 |
| 2014/0087760 A1* | 3/2014 | Bennett ................... H04W 4/21 455/456.3 |

FOREIGN PATENT DOCUMENTS

| | | | |
|---|---|---|---|
| DE | 39904952 T2 | 11/2003 | |
| DE | 69904952 | 11/2003 | |
| EP | 1310930 * | 5/2003 | ........... G08G 1/0968 |
| JP | 2001-229418 A | 8/2001 | |
| JP | 2001-256526 A | 9/2001 | |
| JP | 2002352163 | 12/2002 | |
| JP | 2003-099832 A | 4/2003 | |
| JP | 2003-123109 A | 4/2003 | |
| JP | 2003123109 | 4/2003 | |
| JP | 2004525454 | 8/2004 | |
| JP | 2004252454 | 9/2004 | |
| JP | 2005352615 | 12/2015 | |
| KR | 10-2009-0109988 A | 10/2009 | |
| WO | WO 03042950 A1 * | 5/2003 | ............. G06Q 30/02 |

OTHER PUBLICATIONS

International Search Report and Written Opinion received for Patent Application No. PCT/US2013/048403, dated Oct. 18, 2013, 11 pages.
First Office Action for Chinese Application No. 201380044672.6, dated Feb. 20, 2017, 36 pages (19 pages English translation).
Preliminary Rejection for Korean Application No. 2015-7005149, dated Apr. 28, 2017, 10 pages (4 pages English translation).
Extended European Search Report received in European Patent Application No. 13842769.5, dated Feb. 26, 2016, 8 pages.
Office Action for JP Patent Application No. 2015/534477, dated Dec. 20, 2016, 5 pages (2 pages English translation).
Office Action for KR Patent Application No. 2016/7005149, dated Sep. 23, 2016, 4 pages (1 page English translation).
Office Action from Japanese Application No. 2015-534477 dated May 24, 2016. (5 pgs., including 2 pgs. translation).
Second office action for Chinese Application No. 201380044672.6, dated Oct. 30, 2017, 29 pages (14 pages English translation, 13 pages Chinese).
Office Action for Korean Application No. 2015-7004149, dated Mar. 2, 2018, 8 pages (4 pages English Translation, 4 pages Korean).
Office Action from Chinese Application No. 201380044672.6, dated May 4, 2018, 24 pages (13 pages English Translation, 11 pages Chinese).
Office Action for Japanese Application No. 2015-534477, dated May 30, 2018, 4 pages (2 pages English translation, 2 pages JP)
Office Action for European Application No. 13842769.5 dated Aug. 9, 2017, 10 pages.
Fourth office action from Chinese Application No. 201380044672. 6, dated Nov. 1, 2018, 22 pages (12 English translation, 10 Chinese).

* cited by examiner

| | | |
|---|---|---|
| 602 | DELIVER RECOMMENDATION TO USER |  |
| 604 | RECEIVE USER SOLUTION TO PURCHASE |  |
| 606 | SERVER TRANSMITS PURCHASE TO VEHICLE | 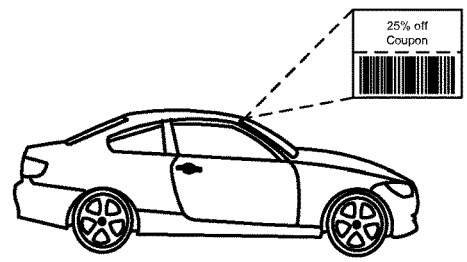 |
| 610 | SERVER RECEIVER VEHICLE DATA WHEN VEHICLE PASSES THROUGH TOLL-BOOTH | 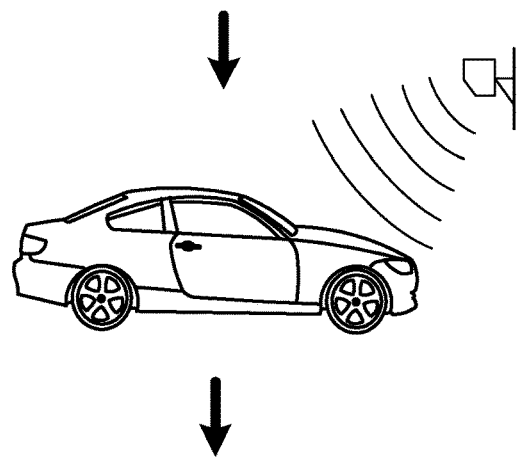 |
FIG. 6B
FIG. 6A

SYSTEMS AND METHODS FOR GENERATION OF INCENTIVE OFFERS FOR ON-ROAD USERS

TECHNICAL FIELD

The present disclosure relates generally to generation of offers, and more particularly, to generation of incentive offers for on-road use.

BACKGROUND

Traffic congestion is an increasing problem as the world's urban population increases, while the roadway resources remain limited. It is currently characterized by slower speeds, longer trip times, and increased vehicular queuing. The most common example is the physical use of roads by vehicles. Additionally, traffic may be very congested at certain times of the day and not at other times. However, proposals to alleviate traffic congestions have had issues because of the difficulty in predicting traffic congestions.

BRIEF DESCRIPTION OF THE FIGURES

Reference will now be made to the accompanying drawings, which are not necessarily drawn to scale, and wherein:

FIG. 6A-6B are illustrations of a flow chart detailing an example method for redeeming purchases, according to some embodiments of the disclosure.

DETAILED DESCRIPTION

Figure 1:
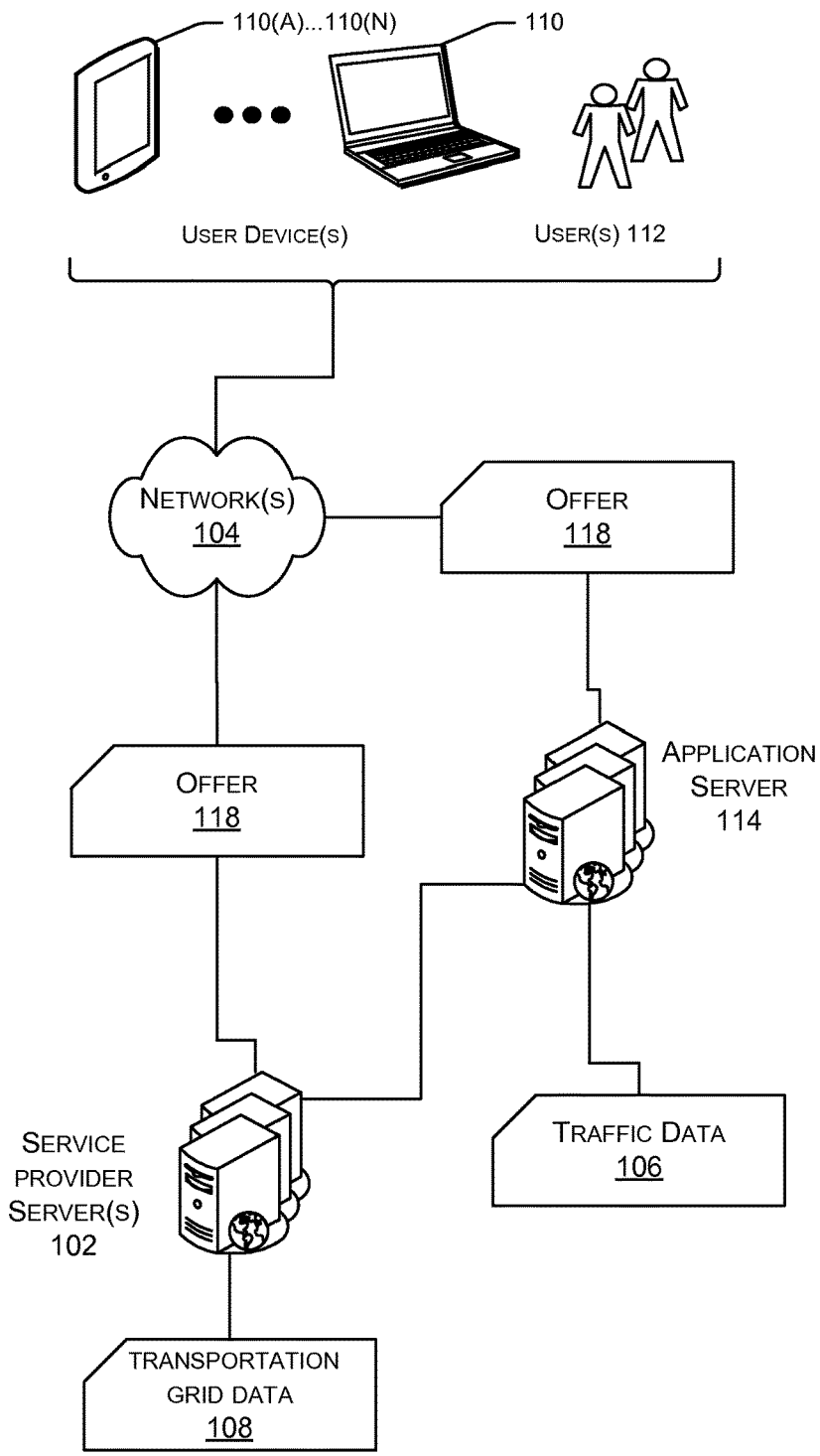
FIG. 1 is a schematic block diagram of an example system or architecture that may be utilized to generate discount user offers for electronic toll passes, according to some embodiments of the disclosure.

Embodiments of the disclosure are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Traffic patterns on a typical route may fluctuate throughout a given day, week or monthly period such that commuting times for a route may vary as much as an hour based on the time period. For example, certain routes that are located in commercial areas may be congested during times that may correspond with typical business hours. During these times, traffic may be stagnated or jammed. However, during off-peak hours, the routes may be relatively uncongested, and traffic may move fairly quickly through the routes. Consequently, the commute time during peak periods may be 2 hours more than the commute time during off-peak hours. As an illustration, many businesses operate between the hours of 9:00 am and 5:00 pm, therefore, traffic routes near business locations may be congested between the hours of 8:00 am and 9:00 am. However, at 10:00 am, the same route may be relatively empty with little congestion. In this example, the commute time may be reduced throughout the day if some of the traffic that normally travels between 8:00 am-9:00 am, were to commute between 10:00 am-11:00 am.

It may be possible to reduce traffic congestion during rush hours by offering purchasing incentives for electronic toll passes through certain area. These incentive offers may enable a user to receive an applied incentive which may be a discount offer conditioned upon the user commuting at a non-rush hour time. The applied incentive may also include a penalty for commuting during times in which the traffic is highly congested Other applied incentives may include a reduced price for routes identifying certain roadways and motorways with less traffic There may also be penalties or increased prices associated with travel on other roadways or times where there is traffic congestion. These incentives may be configured for use on existing transportation grid infrastructure. Typically, many transportation grids use RFIDs and vehicle transmitters as a way of collecting tollway payments. The incentives may also utilize an RFID transmitter or a vehicle transmitter configured to enable communication between an embedded DSRC radio in the vehicle and any authorized collection infrastructure which may comprise both government regulated infrastructure (toll collection) and commercially controlled infrastructure (e.g. wireless gas station payment, drive through dining payment).

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

As used herein, the term "vehicle" may refer generally to an automobile, car, truck, passenger vehicle, bus, or the like.

As used herein, unless otherwise specified, the term "user device" refers, in general, to a wireless communication device, and more particularly to one or more of the following: a processing electronic device, a telephone (e.g., cellular phone, smart phone), a computer (e.g., laptop computer, tablet computer, desktop computer), a portable media player, a personal digital assistant (PDA), or any other electronic device having a networked capability.

As used herein, unless otherwise specified, the term "Vehicle Computing System (VCS)" may refer to an in-vehicle computing device, navigational system for use in a vehicle, vehicle infotainment system, or any other similar system or device.

As used herein, unless otherwise specified, the term "service provider server" may refer to any computing device having a networked connectivity and configured to provide one or more dedicated services to clients, such as any user devices or in-vehicle computation system. The services may include storage of data or any kind of data processing. One example of the central server includes a web server hosting one or more web pages. Some examples of web pages may include social networking web pages.

As used herein, unless other specified, the term "transportation grid" may refer to any roadway, street, motorway, light rail or monorail system configured to accept toll, fees, prices or other forms of payment through a similar payment infrastructure.

As used herein, unless otherwise specified, the term "transit point" may refer to any a tollbooth, ticketing entity, parking structure, roadside parking meters configured to accept payment through a radio transmitter system.

According to one or more embodiments, the mobile device and/or the VCS may determine their current location by processing satellite navigation data such as Global Positioning System (GPS) data or any other suitable satellite system data. Alternatively, the location may be determined by processing multilateration data associated with the user mobile device. The location determination may be based on auxiliary data received from cellular network base stations, web servers, network routers, and so forth.

Embodiments of the present disclosure may include generating offers for electronic toll passes, wherein the electronic toll passes may be prepaid, for a use condition. based on analyzing historical traffic data for the transportation grid. Certain embodiments may include a server, a mainframe, or any suitable computational device to analyze historical vehicle traffic data In certain embodiments, the historical transit data may be stored locally or retrieved externally from other sources such as a third-party map software, GPS data, and in some instances, data from VCS using a network. Based on the historical vehicle traffic data, it may be possible to identify an offer and an associated applied incentive for an electronic toll pass which may result in usage of an alternative route or an alternative commute time. In certain examples, a transit point associated with a certain highway or roadway may be congested at a certain time, however, if an alternative route which may run parallel to the congested route may have significantly less traffic during the same time. Therefore, it may be possible to identify these routes and generate an offer for an applied incentive for electronic toll passes with a conditioned use pertaining to an alternative route, time.

The system and methods may generate offer for an electronic toll pass based on historical vehicle traffic data. The incentive offers for the electronic toll pass may be conditioned upon a specific route, time, day of week etc. Further, there may be a limit on the total number of incentive offers that may be purchased to ensure smooth flow of traffic.

Embodiments of the disclosure may also disclose methods for facilitating, a distribution for the one or more offers to a user group. A user group may be defined as users who typically commute in a single geographic area, similar demographics, vehicles, commute routes etc.

In further embodiments, a service provider server may identify related incentive offers for distribution for a user group. For example, if a certain coffee shop is located near a transit point, the service provider may identify the related incentive offer, and transmit these incentive offers to the user group using the application portal or a website.

In certain embodiments, the service provider server may output these incentive offers to a website or other user-interface application. In certain embodiments, the offers may be transmitted to a third party aggregator site such as GROUPON® or LIVINGSOCIAL®. In other embodiments, the service provider server may generate a user interface to transmit the offers.

The service provider server may associate the purchase of an incentive offer with a user's transit profile. The user profile may contain account information such as a user's account number, user vehicle associations, vehicle VIN numbers, a prepaid balance, credit card, and other payment information. The user profile may also have an identifier for a radio transmitter device which may be located on the user's vehicle.

Upon purchase of the incentive offer, the system may generate a certificate representing the conditioned use. The certificate may be configured transmit a signal from the electronic toll collections pass which may identify a user profile or a coupon associated with the offer. In certain embodiments, certificate may be encrypted to authenticate exactly one unique vehicle with the coupon. Further illustrative embodiments, a vehicle may be associated with an electronic toll pass In some examples, a Radio Frequency Identification Device may be used. In other examples, a VCS may have an on-board transmitter configured to transmit signals to a transit point.

In further examples, the electronic toll pass may authenticate a vehicle, to ensure that the electronic toll pass is used on a unique vehicle. Further, the electronic toll pass may be deactivated, when a particular vehicle can no longer be authenticated The RFID tag may be a passive RFID tag or an active RFID tag. The certificate representing a coupon may be may be transmitted to the vehicle either using a network connection, or through a wired connection. In one embodiment, the certificate may be received through a portable memory system and physically downloaded onto the RFID tag. In other embodiments, the certificate may be transmitted to a long-range receiver vehicle using an available long-range radio signal such as a 3G. The long-range receiver may be built into a VCS. In other embodiments, {the certificate may be transferred through the OBD port of a vehicle.

In a passive RFID tag, as a vehicle transits through a transit point. The transit point may transmit an interrogator signal to all incoming vehicles. The interrogator signal activates the passive RF signal in response to receiving the interrogator signal. Further, the transit point may be configured with a receiver, to receive the signal from the vehicle.

Embodiments of the disclosure now will be described more fully hereinafter with reference to the accompanying drawings, in which certain embodiments are shown. This invention may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring now to FIG. 1, which illustrates a block diagram of an example system 100, architecture, or component to facilitate the generation of a discounted user offer. In certain embodiments, the system 100 may be used as an application server 114. In other embodiments, it may be a stand-alone application on a computing device, mobile device or any other such combinations. In other embodiments, the system 100 may be implemented or embodied as a component of another system or device, such as a vehicle computing system (VCS) associated with a vehicle. In yet other embodiments, one or more suitable computer-readable media may be provided for generating an incentive use offer associated with a electronic toll pass. A service provider server(s) 102 may generate the offer for the electronic toll pass. The service provider server(s) 102 may include any number of processor-driven devices, including, but not limited to, a server computer, a personal computer, one or more networked computing devices, an application-specific circuit, a minicomputer, a microcontroller, and/or any other processor-based device and/or combination of devices.

The service provider server(s) 102 may be communicatively connected with any number of networks 104. The networks 104 may include any one or a combination of different types of suitable communications networks, such as cable networks, the Internet, wireless networks, cellular networks, and other private and/or public networks. Furthermore the networks 104 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

The service provider server(s) 102 may retrieve traffic data 106 and transportation grid data 108 through the networks 104. Traffic data 106 may include, but is not limited to any number of parameters relevant to determining the overall traffic flow on the road. Some of these parameters may include: traffic flow at various intersections, data regarding major arteries, minor arteries, roadway map of an area, traffic flow at a given routing location such as a tollbooth or toll point, total number of vehicles in use for a given period in time for an area, the average speed of the vehicles during the certain period in time, the average number of vehicles, peak hours for a toll location in a given day, variations in usage for a location, variations in usage during a given time period, traffic patterns, direction of traffic. In certain embodiments, the traffic data 106 may be collected by placing sensors in various locations throughout an area, such as a city or a metro area. Some of the sensors may be visual sensors such as a camera or an infra-red sensing device. Sensors may include speed sensors, physical roadway sensors which may sense vehicles as they travel past a certain point. Furthermore, the service provider server(s) 102 may receive traffic data 106 collected by third parties and other available sources.

With continuing references to FIG. 1, the service provider server(s) 102 may also receive transportation grid data 108 various locations, arteries, roadways throughout the transportation grid. The transportation grid data 108 may contain usage data for a given point on the grid. Other types of data that may be collected by scanning an electronic toll pass from a vehicle such as user account. In certain embodiments, the transportation grid data 108 may be collected through sensors available at various locations.

With continuing reference to FIG. 1, the service provider server(s) 102 may generate offers for electronic toll passes within a transportation grid based on analysis of the traffic data 106 and transportation grid data 108 among other factors. In one illustrative example, offers may be generate to reroute traffic from a first congested motorway to a second relatively free motorway that runs parallel to the first motorway. In this illustrative example, offers may be generated such that the electronic toll passes for the second motorway is discounted in comparison to the first motorway. In certain embodiments, an offer may be limited to a certain route or a group of routes. Alternatively, an offer may be restricted to certain times throughout the day, some offers may be restricted to certain days of the weeks, certain seasons or any combination thereof. Subsequently, the offers 118 may be transmitted to the users 112 through a user portal such as a website or an application on a user device 110. In certain embodiments, the service provider server(s) 102 may provide for a user access and purchase these offers. In other embodiments, the service provider server(s) 102 may transmit the offers to one or more application servers 114. The one or more application servers 114 may include any number of processor-driven devices, including, but not limited to, a server computer, a personal computer, one or more networked computing devices, an application-specific circuit, a minicomputer, a microcontroller, and/or any other processor-based device and/or combination of devices. The application server 114 may host an infrastructure to aggregate offers from various entities. The user may access a website available on the application server 114.

The one or more application servers 114 may accept payment through the use of a credit card, debit card, a bank deposit or other available payment methods. The application server 114 may also limit the purchase of the total number of electronic toll passes that may be sold. The application server 114 may enable a user device 110 to access the offers 118.

The user device 110 may include but is not limited to, a personal computer, a desk top computer, a notebook computer, a laptop computer, a personal digital assistant (PDA), an electronic book reader (e-book reader), a tablet computing system, a pad computing system, a smart phones, a portable gaming device, or combinations thereof. The user device 110 may include one or more user input interfaces to accept a user input. The user device 110 may further be configured with network interfaces for accessing various communication protocols such as Wi-Fi, Wi-Fi Direct, BLUETOOTH, BLE, cellular, 3G, 4G, LTE, or WiMAX, as may be utilized to communicate with wireless networks and access points.

Figure 2:
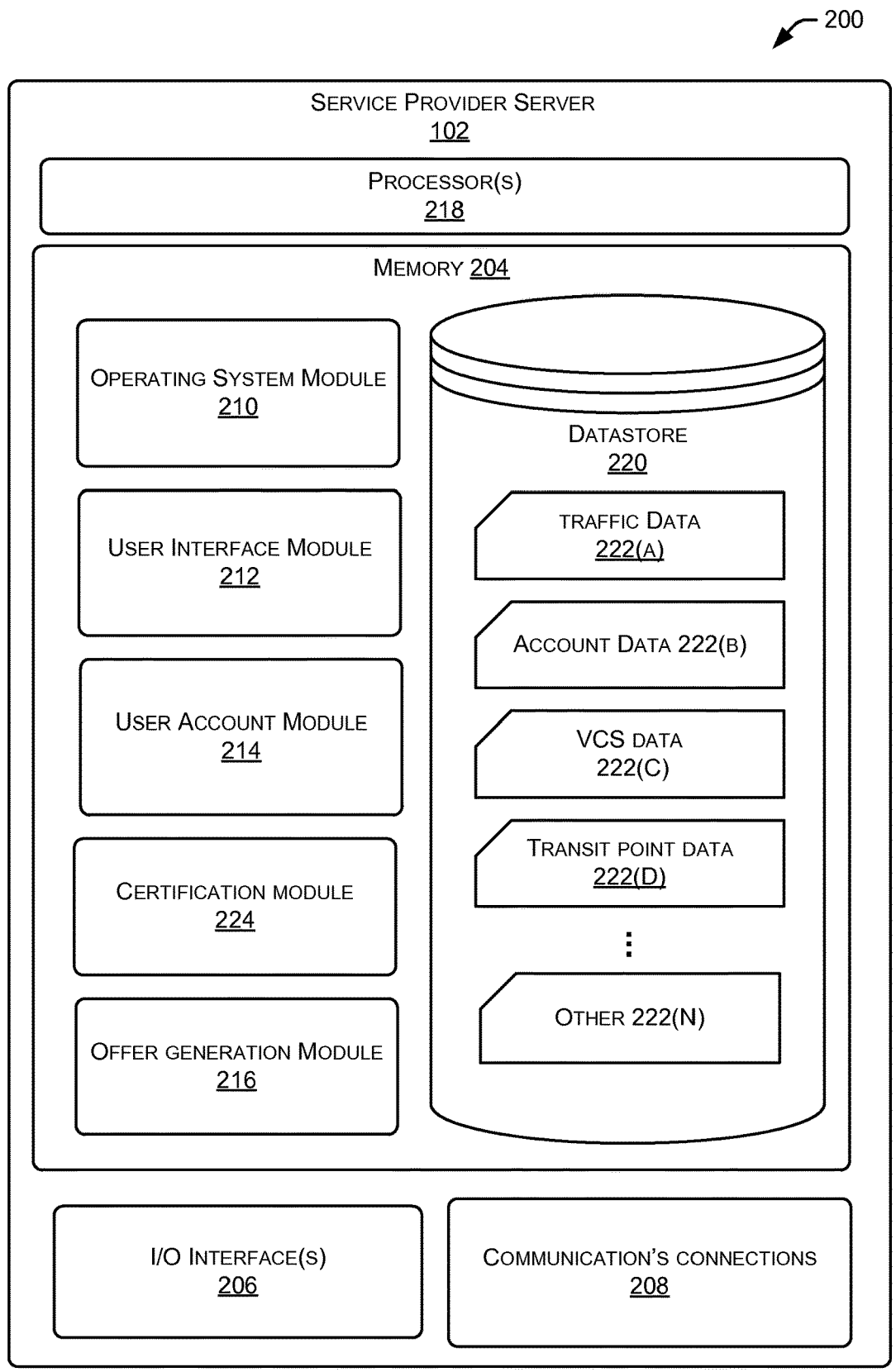
FIG. 2 is a schematic illustration of an example system or architecture of a server system configured to generate and manage discount user offers for electronic toll passes, according to some embodiments of the disclosure.

Referring now to FIG. 2, a schematic block diagram illustrative of the service provider server 102. The service provider server(s) 102 may include any number of processor-driven devices, including, but not limited to, a server computer, a personal computer, one or more networked computing devices, an application-specific circuit, a minicomputer, a microcontroller, and/or any other processor-based device and/or combination of devices.

A service provider server(s) 102 may include one or more processors 218 to execute computer-readable instructions that facilitate the general operation of the service provider server(s) 102 and/or provisions of the offer generation module 216, user interface modules 212, operating system modules 210 or user account module 214). The processors 218 (hereby will be known collectively as processors) may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors 218 may also include a chipset (not shown) for controlling communications between the one or more processors 218 and the one or more of the other components of the service provider server(s) 102. In certain embodiments, the processors 218 may be based on an Intel® Architecture system, and the processor(s) 218 and chipset may be from a family of Intel® processors and chipsets, such as the Intel® Atom® processor family. The one or more processors 218 may also include one or more application-specific integrated circuits (ASICs) or application-specific standard products (ASSPs) for handling specific data processing functions or tasks.

In addition to having one or more processors 218, the service provider server(s) 102 may further include one or more memory devices 204 (generally referred to as memory), one or more input/output ("I/O") interface(s) 206, and/or one or more communication connections 208.

The memory 204 may be any computer-readable medium, coupled to the one or more processors 218, such as random access memory ("RAM"), read-only memory ("ROM"), and/or removable storage devices. The memory 204 may store one or more program modules utilized by the service provider server(s) 102, such as an operating system (OS) 210. The one or more program modules may include user interface module 212, an user account module 214 offer generation module 216.

Certain embodiments may be provided as a computer program product including a non-transitory machine-readable storage medium having stored thereon instructions (in compressed or uncompressed form) that may be used to program a computer (or other electronic device) to perform processes or methods described herein. For example, certain embodiments may be provided as a computer program product or group of products that may be executed by the service provider computers 102 or other suitable computing systems. The machine-readable storage medium may include, but is not limited to, hard drives, floppy diskettes, optical disks, CD-ROMs, DVDs, read-only memories ("ROMs"), random access memories ("RAMs"), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, distribution of software may be Internet download.

The memory 204 may store instructions for execution by the one or more processors 218 which may perform certain actions or functions. These instructions may include an operating system 210 configured to manage hardware resources, such as the I/O interfaces 206 and provide various services to applications executing on the one or more processors 218 The one or more memories 204 may also store one or more datastores 220 containing data files (222(A) . . . 222(N)) regarding various traffic data 222(a), account data 222 (B), VCS data 222(c) and transit point data 222(D) These datastore 220 may comprise lists, arrays, databases, flat files, and so forth. In some implementations, the datastores 220 may be stored in memory external to service provider server(s) 102, but accessible via a network, such as with a cloud storage service. The data stores 220 may also be populated with third-party data or other data sources. The communication connections 208 may interface with a datastore 220, which may contain one or more data files, such as [220(A) . . . 222(N)], which may include sensor data, account data 222(B), environmental data, vehicle device data and traffic data among other relevant data.

The OS 210 may be any suitable module that facilitates the general operation of the service provider server(s) 102 as well as the execution of other program modules. The one or more program modules, such as the offer generation module 216, user interface module 212 user account module 214 may include one or more suitable software modules and/or applications configured to generate offers and manage purchase of electronic toll passes based on these offers based on historical traffic data 222(A).

The offer generation module 216 may be a hardware, software or firmware implementation configured to generate offers for electronic toll passes. A software or firmware implementation of the offer generation module 216 may include computer-executable or machine-executable instructions written in any suitable programming language to perform the various functions described herein. The offer generation module 216 may generate offers based at least in part on historical transit data 222(A). The historical transit data 222(A) may be retrieved from the datastore 220.

In an example embodiment, the offer generation module 216 may retrieve plurality of data files or data store modules located in the data store 220 such as traffic data, vehicle data, historical data etc. Based in part on the analysis of these data stores, the offer generation module may identify transit points for generating offers with applied incentives. In order to identify the transit points, the offer generation module may determine a plurality of criteria for a use condition. One such example of a use-condition may be to reduce commute time between 9:00 am-10:00 am on Geogia-400. The offer generation module 216 may generate an offer an applied incentive for the use-condition. One such example of an applied incentive may be a $5 discount on a monthly pass for commuters who travel between 10:00 am-11:00 am. Another applied incentive may be a $5 penalty for commuters who travel between 9:00-10:00 am. Another example of an applied incentive may be a 20% discount for commuters who travel on a parallel route to Georgia-400. Methods and systems associated with the offer generation module 216 will be discussed further in FIG. 4

The user interface module 212 may be a hardware, software or firmware implementation configured for creating and managing a user interface associated with the generated offer. A software or firmware implementation of the user interface module 212 may include computer-executable or machine-executable instructions written in any suitable programming language to perform the various functions described herein. In one illustrative embodiment, the user interface module 212 may create a website or a user interface to enable viewing and purchasing of the generated offers. In other embodiments, the user-interface module may communicate with a third-party website or an offer aggregator to facilitate user viewing and purchasing of the generated offers on the third party platform. In other illustrative embodiments, the user interface module 212 may manage and transmit offers for display on a website. The third party server may also generate a third-party website capable of handling requests from many users 112 and serving, in response, various user interfaces that can be rendered on the user devices 110. Further, the third party website may also handle and receive interactions from other service providers and merchants. The third-party website can be any type of website that supports user interaction, including social networking sites, online retailers, ticket sellers or resellers, concert sites, sporting event sites, airline sites, informational sites, blog sites, search engine sites, news and entertainment sites, and so forth. As discussed above, the described techniques can similarly be implemented outside of the third-party website.

In some examples, the third-party website may host a platform for interacting with other users and/or sharing offers for other products and services, where at least some of the offers may be discounted or special offers. Additionally, the website may host an electronic catalog that may include special offers for a limited time period. An incentive offer may include anything that the website outputs for viewing, sharing, purchasing, renting, subscribing to, informing, or for some other form of consumption. The third-party website may also host a platform that may enable the service provider server(s) 102 to interact with the offers. The service provider server(s) 102 may transmit the one or more offers to the third-party website. The third party web-site may manage the purchase of these offers. Managing the purchases of these offers may include, but is not limited to: restricting the number of purchases, collecting payment such as credit card information.

In one non-limiting example, a user 112 may access a website via a user application, which may be generated by the user-interface module 212 of at least one of the user devices [110(A) . . . 110(N). In some aspects, the user application may be a Web browser, a mobile application, a dedicated application, or any way of accessing the website. As such, the user application may provide and receive hypertext markup language ("HTML") requests and responses from a server, such as the service provider server(s) 102. In some examples, the website may be hosted by the service provider server(s) 102 or any other third-party Web server (such as an application server 114). The user 112 may be presented with a graphical user interface ("GUI") that may provide a home screen, where the user 112 may interact with an order, user profiles, digital content, products, services, information, etc., of the website. Further, the GUI may be configured to display one or more offers to the user. The offers may be restricted to a user based at least in part on a user's geographic region. The user may view the offers for a plurality of electronic toll passes where each of the plurality of electronic toll passes may have different terms and conditions.

In some examples, a user 112 may log in or otherwise enter a session in either a third-party website or a website hosted by the service provider server(s) 102. The log-in may be based on receipt of log-in credentials such as a user identifier ("ID") and/or a password. The user-interface module 212 may further provide an interface for the user to input purchasing information and select at least one of a plurality of offers to purchase.

In one non-limiting example, then the user interface module 212 may be configured to accept and facilitate the purchase of the offers. In one embodiment, by way of a mobile device or another client device (such as a laptop computer or tablet), a user can download a downloadable file or instructions configured to facilitate offers. Further embodiments may include an application program or app designed to execute on the mobile device or other client device. When prompted, the user can create an account and input certain identification information using the user interface. Identification information may include a name, mobile telephone number, email or messaging address, or social media application account name. In some embodiments, the user can input a payment method, such as adding a bank account number, payment device number, security code. In other instances the user 112 can charge, load, or otherwise authorize the account with a pre-paid value for use in purchasing the offers. In further instances, the user 112 may purchase electronic toll pass device. The electronic toll pass 300 will be discussed in further detail in FIG. 3.

The user account module 214 may be a hardware, software or firmware for managing user account profiles and electronic toll passes associated with each of the users. A software or firmware implementation of the user account module 214 may include computer-executable or machine-executable instructions written in any suitable programming language to perform the various functions described herein. The user account module 214 may store user account information from the website or a user interface and handle the storage of other data after a coupon is purchased. The user account module may also associate a user with a number of user vehicles. Further, for each of the user vehicles, the user account module may associate a corresponding electronic toll pass. A electronic toll pass device may have a unique transponder identification and also may be configured to function in only one vehicle. In some embodiments, each electronic toll pass module 300 may be credited with a prepaid monetary value. Alternatively, the user account may store payment information for managing access to all the transit points available on the transportation grid. The user account may also be further associated with one or more special offers for transit locations. For example, if a vehicle is charged $5.00 for access through a transit point, the user account module may deduct the $5.00 from the prepaid monetary value. However, if the vehicle is associated with an offer with a particular applied incentive of $30.00 for one month of travel between 10:30 a.m.-11:00 a.m. The applied incentive may be applied upon detection of the conditions for the offer. Therefore, if the vehicle travels between 10:30 a.m. and 11:00 a.m., the applied incentive may be utilized. However, if the vehicle travels between 11:30 am-12:00 am, then the vehicle may be charged $5.00 for access through the transit point.

The certification module 224 may include computer-executable instructions that, when executed by the processors 218, cause various authentication operations to be performed. For example, computer-executable instructions provided as at least part of the certification module 224 may be executed by the processor 218 to authenticate the vehicle for which the electronic toll pass was purchased or to facilitate authentication of the electronic toll pass. The certificate module 224 may transmit the certificate to any entity that issues digital certificates used to authenticate the electronic toll passes. For example, the certification module 224 may transmit the certificate to third-party vendors of the electronic toll pass. The certificate may be encrypted to authenticate or identify a unique vehicle. For example, the certificate may contain an encryption based at least in part on a vehicle VIN number or another code which may uniquely identify the vehicle In other examples, the certificate may be based at least in part on an encryption associated with the electronic toll pass module receiving a handshake or an authentication signal from the vehicle. Further, the certificate may be encrypted with the vehicle VIN number, such that the certificate may be inactive when removed from the vehicle or transferred between vehicles. Further interactions with the electronic toll pass 300 and the certificate will be described in greater detail in FIG. 3.

Upon generating the certificate, the service provider servers 102 may transmit the certificate either remotely to the electronic toll pass module 300 or through a VCS on a user device 110. The certificate may be downloaded onto the electronic toll pass module 300. In one embodiment, the certificate may be downloaded on a portable memory storage device such as a USB device and subsequently transferred to the vehicle computing system or electronic toll pass module 300. In other embodiments, the certificate may be transmitted to an electronic toll pass by way of a vehicle communication device configured with long-range radio, through a long-range radio signal such as a 3G.

Other modules may be present in the memory 204 as well. These modules may provide functions including authorization, authentication, accounting, security, and so forth.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Figure 3:
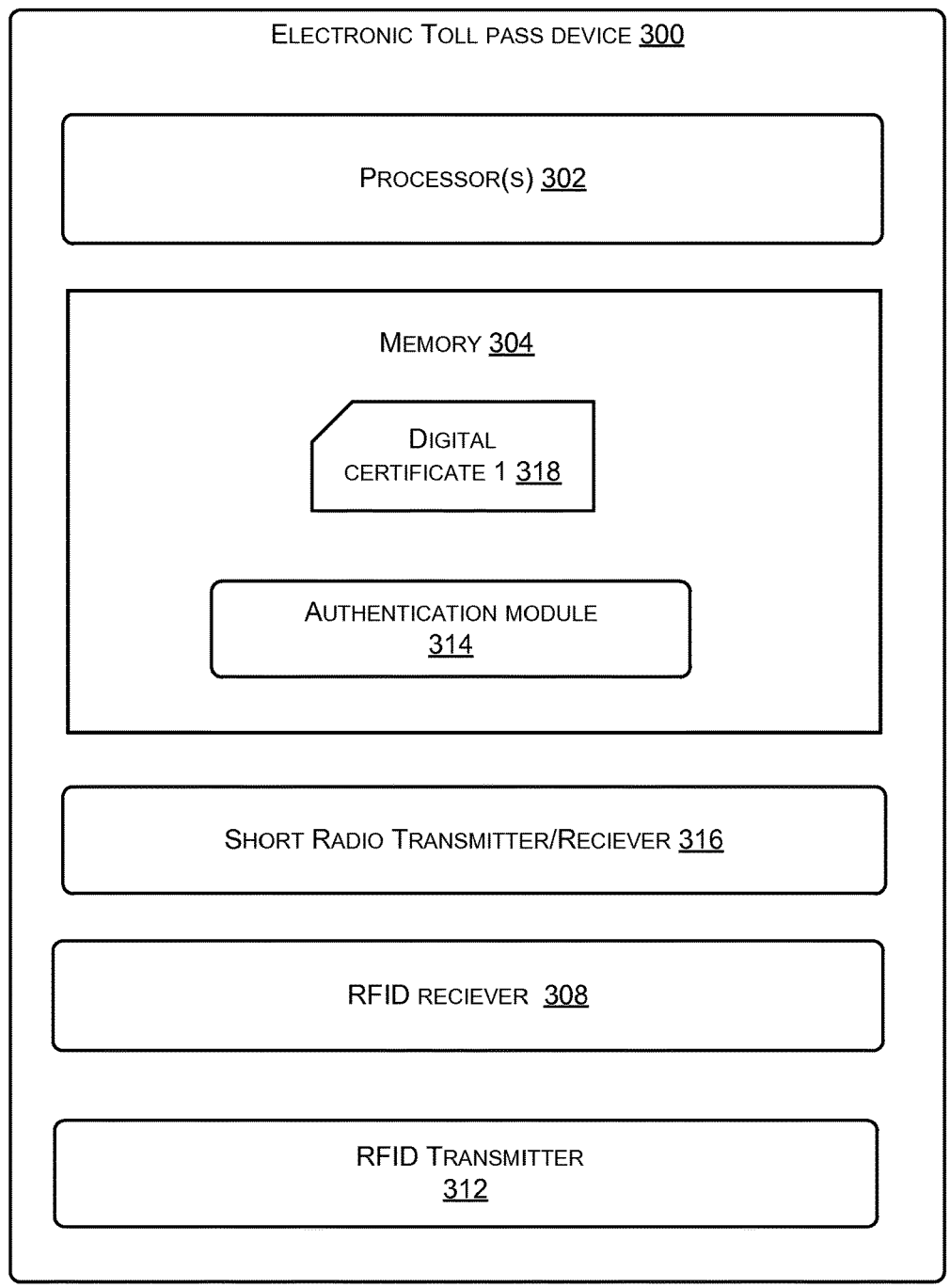
FIG. 3 is a schematic illustration of an example system or architecture of an electronic toll collections device, according to some embodiments of the disclosure.

Referring now to FIG. 3, which is an illustrative example of an electronic toll collections pass 300. The following electronic toll pass 300 may be described with reference to any short-range wireless device configured to emit a short-range wireless signal. However, this particular figure describes an example active RFID transmitter However, the example device is not so limited and can be applied to any radio transmitter configured to transmit short-range signals to a reader associated with a transit point. In other examples, an RFID tag which is passive may be used to provide access through the transit point. In some examples, other radio signals such as short-range radio such as a BLUETOOTH, long-range radio such as a 3 G communication may be used. In other non-limiting examples, a vehicle may be configured with an on-board transmitter to transmit the digital certificate to a reader at the transit point. Further, the vehicle may be equipped with an onboard transmitter.

As referenced in FIG. 3, the electronic toll pass device 300 may be used in some embodiments, The electronic toll pass device 300 may be mounted to a vehicle. In some illustrative examples, the electronic toll pass device 300 may be affixed to a front window of a vehicle.

The electronic toll pass device 300 may be configured with one or more processors 302. The processor(s) 302 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The electronic toll pass 300 device may also include a chipset (not shown) for controlling communications between the one or more processors 302 and the one or more of the other components of the electronic toll pass 300. In certain embodiments, the processors 302 may be based on an Intel® Architecture system, and the processor(s) 302 and chipset may be from a family of Intel® processors and chipsets, such as the Intel® Atom® processor family. The processors(s) 302 may also include one or more application-specific integrated circuits (ASICs) or application-specific standard products (ASSPs) for handling specific data processing functions or tasks.

The electronic toll pass 300 may be configured with a memory 304. The memory 304 may be any computer-readable medium, coupled to the one or more processors 302, such as random access memory ("RAM"), read-only memory ("ROM"), and/or removable storage devices. The memory 304 may store one or more program modules utilized electronic toll pass 300. The machine-readable storage medium may include, but is not limited to, hard drives, floppy diskettes, optical disks, CD-ROMs, DVDs, read-only memories ("ROMs"), random access memories ("RAMs"), EPROMs, EEPROMs, flash memory, magnetic or optical cards, solid-state memory devices, or other types of media/machine-readable medium suitable for storing electronic instructions.

The memory 304 may store data files such as a digital certificate 318. The digital certificates may represent the purchase of a discount offer or an electronic toll pass 300 purchase.

The electronic toll pass device 300 may also be configured with a short-range radio transmitter/receiver 316. The short range radio transmitter/receiver 316 may utilize any suitable hardware and software to broadcast and receive signals either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The short-range radio transmitter/receiver 316 may operate in a broad range of operating frequencies governed by the IEEE 802.11 wireless standards. The short-range radio transmitter/receiver 316 may be limited in range to wireless personal area networks such as those described by IEEE 802.11p. Some examples of a short-range radio signal may include BLUETOOTH. In this particular embodiment, the short-range radio transmitter/receiver 316 may transmit and receive short-range radio signals to transmitting for authentication purposes with the VCS that may be on-board in many vehicles.

The electronic toll pass device 300 may be further configured to receive RFID interrogations from a reader device by way of a RFID receiver 308. The RFID receiver 308 may be configured to respond to an interrogation transmitted by an RFID reader associated with a transit point. For example, the reader may be configured to energize the transmitter upon receiving an interrogation.

The electronic toll pass device 300 may be further configured to with an RFID transmitter 312 to transmit an RFID signal representing the digital certificate 318 to an external reader associated with the transit point.

The memory 304 may store one or more program modules utilized by electronic toll pass device 300. The one or more program modules may include an authentication module 314. The authentication module 314 may perform various functions related to authenticating a vehicle with respect to the digital certificates. The authentication module 314 may also authenticate a vehicle associated with the purchase of the offer or electronic toll pass. In one embodiment, the authentication module 314 may transmit a handshake signal through the short-radio transmitter/receiver 316 to the vehicle. The authentication module may also be configured to receive a response signal from the vehicle. The signal may be decoded by the authentication module 314 and verified.

Such verification may include decoding or decrypting a message that was encoded at the user device 110. In one embodiment, if the response is successfully authenticated, the authentication module 314 may enable the transmission of the digital certificate 318 to the reader associated with a transit point. If the response is not successful, and verification does not occur, the authentication module 314 may be configured to disable the RFID transmitter 312 in the electronic toll pass module 300. Various techniques may be employed to authenticate a message including, but not limited to, cryptographic hash functions (e.g., HMAC), block cipher algorithms (e.g., OMAC, CBC-MAC, and PMAC), and other techniques that may rely upon a private key, public key/private key derivation, secret keys, or other techniques that may encode information such that only an intended device may decrypt the message.

In Certain embodiments, the authentication module 314 may be provided as a computer program product including a non-transitory machine-readable storage medium having stored thereon instructions (in compressed or uncompressed form) that may be used to program a computer (or other electronic device) to perform processes or methods described herein. For example, certain embodiments may be provided as a computer program product or group of products that may be executed by the service provider computers 102 or other suitable computing systems. The machine-readable storage medium may include, but is not limited to, hard drives, floppy diskettes, optical disks, CD-ROMs, DVDs, read-only memories ("ROMs"), random access memories ("RAMs"), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, distribution of software may be Internet download.

Figure 4:
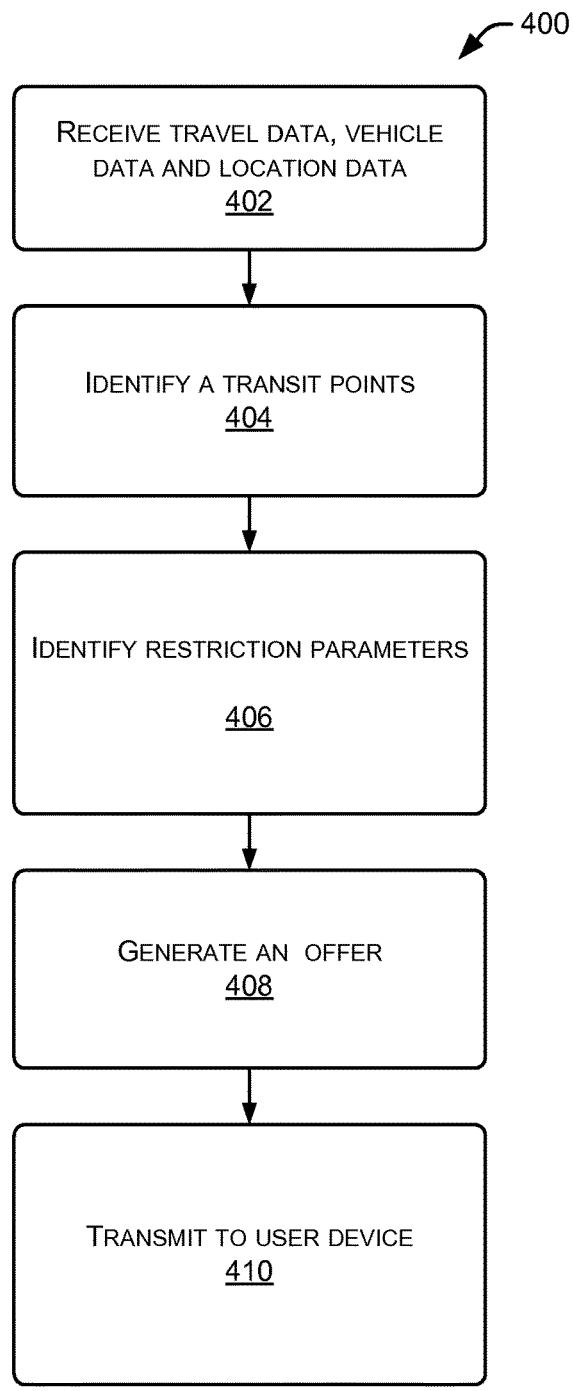
FIG. 4 is flow chart indicating an example method for generating discount offers, in accordance with the embodiments of the disclosure.

Referring now to FIG. 4, is a flow chart illustrating an example method to generate a coupon offer incentive The operations described and shown in the methods and/or processes 400 of FIG. 4 may be carried out or performed in any suitable order as desired in various embodiments. Additionally, in certain embodiments, at least a portion of the operations may be carried out in parallel. Furthermore, in certain embodiments, less than or more than the operations described in FIG. 4 may be performed.

In operation 402, the system may retrieve historical data such as traffic data, vehicle data and transportation grid data. Further data may include vehicle flow, traffic rates, corresponding times, traffic flow in adjacent roads, vehicle speeds etc. For example, historical information associated with certain transit grids may be identified, accessed, and/or obtained from any number of data sources such as a highway authority, infrared cameras, signals and sensors configured to sense physical presence of a vehicle on a roadway or a motorway. In certain embodiments, information may be identified for a predetermined period of time, such as the previous month, year, seasons etc. As desired, information may also be identified in accordance with any number of other metrics (e.g., geographical area, traffic congestion, roadway type, etc.). In further embodiments, the system may collect data from transit points such as tollbooths as vehicles are scanned. The tollbooth may monitor specific instances where the vehicles pass through these transit points. Additionally and/or alternatively, various user-specific information may be determined through the associated user account. Other information such as GPS location or demographic information may also be retrieved through other sources. Such information may be utilized to select and distribute transit points that may be incentive. Other relevant location data may be overall flow and rate of traffic at all transit point locations on the transportation grid.

In operation 404, a plurality of transit points may be identified for offer generation. The plurality of transit points may be selected based on criteria related to the traffic and vehicle data. The criteria may be dependent upon the overall traffic flow, speed of traffic, congestion, capacity of the roadway and other such factors. For example, if there is a particular route that is highly congested and has heavy traffic flow, the criteria might find a transit point that may allow traffic from nearby surface roads to reroute the traffic flow to the second transition point.

In operation 406, upon identification of the plurality of transit points parameters associated with an offer may be identified. Parameters may dictate special usage in relation to the price of the offer. There may be a time period for the redemption, an expiration date etc. The parameters may related to applying an incentive for purchasing or utilizing a discount offer that may be related to changing the commute time. In one embodiment, algorithm may issuer rules may additionally specify one or more conditions for applying an incentive. Some examples may include limiting traffic, or increasing traffic flow at a different artery or a traffic point. For example, discount offers may be dependent upon a predetermined threshold indicative of traffic flow or congestion. Some of these parameters may include price, time and terms and conditions of these offers. The parameters might also limit the total number of offers generated by a user.

In operation 408, the service provider server(s) 102 may generate offers for purchase and consumption by the users. The offers may include terms and conditions that may restrict the usage of certain routes. Further, the offers may include specific times associated with the usage for the special discount price. The generated offers may be transmitted to a third-party website for purchase by the users.

In operation 410, an offer may be transmitted to a user. In one embodiment, by way of user device 110 such as a mobile device or other client device, such as a laptop computer or tablet, a user can download downloadable configured to facilitate offers, an application program or app to the mobile device or other client device. When prompted, the user can create an account and input certain identification information to the user interface or app, such as a name, mobile telephone number, email or messaging address, or social media application account name. In some embodiments, the user can input a payment method, such as adding a bank account number, payment device number, security code. In other instances the consumer can charge, load, or otherwise authorize the account with a pre-paid value for use in purchasing the offers. In further instances, the user may purchase a electronic toll pass module 300 such as programmable version of a radio frequency transmitter tag such as an EZ-PASS® to enable entry into a point of interest or location.

Figure 5:
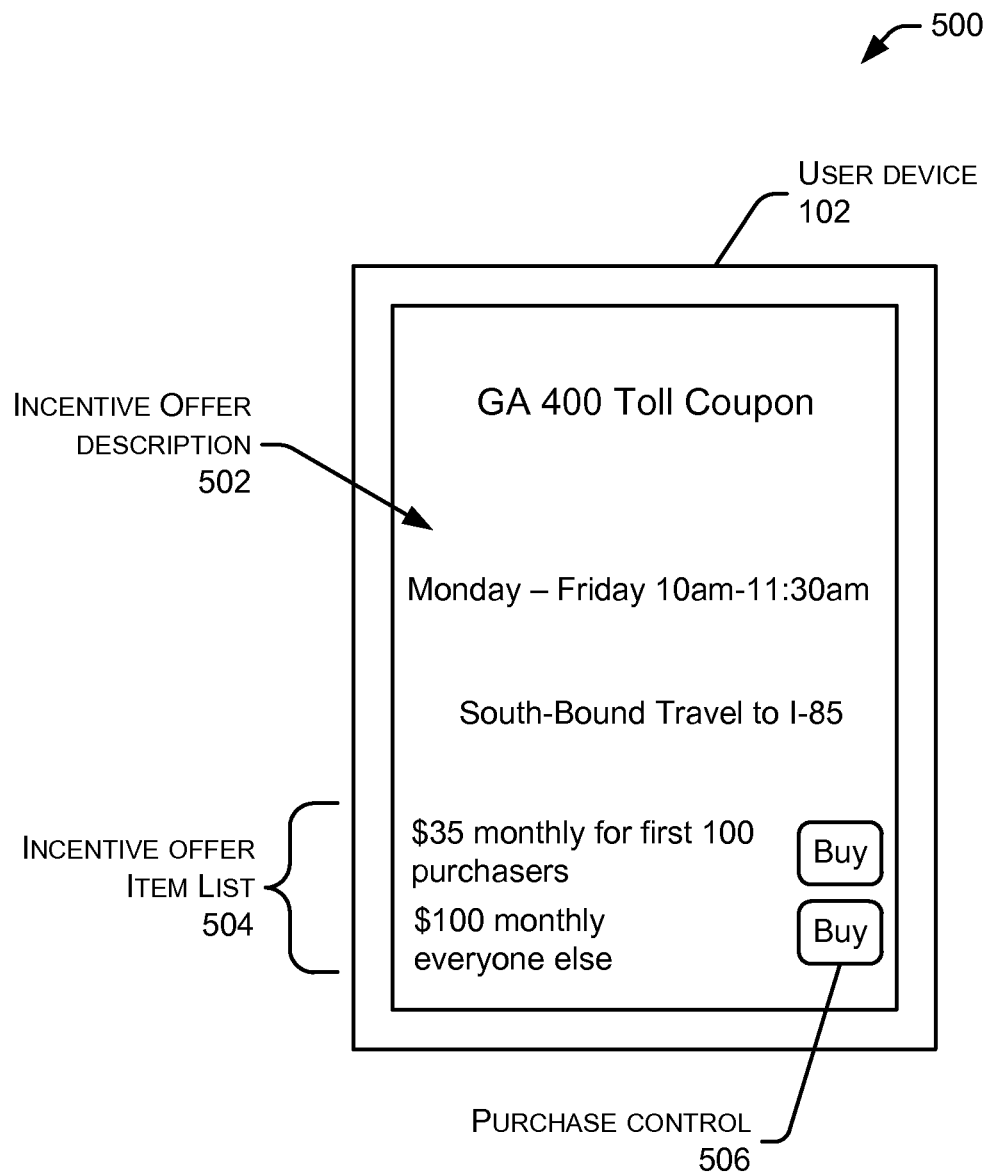
FIG. 5 is an illustration of an example user interface to facilitate the purchase of the offers, according to some embodiments of the disclosure.

FIG. 5 illustrates an example user interface 500 of the user device 110 for purchasing the offer. An incentive offer item list 504 presented, further, incentive offer item list 504 may present one or more incentive offer items. A purchase control 506 may also be presented. When activated, the corresponding coupon item 504 may be purchased. This purchase may be processed by the user account module 214 (See FIG. 2) on the service providers server(s) 102 In some implementations, the purchase may be configured to occur automatically, such as when the user 112 has previously configured or approved this action.

Figure 6B:
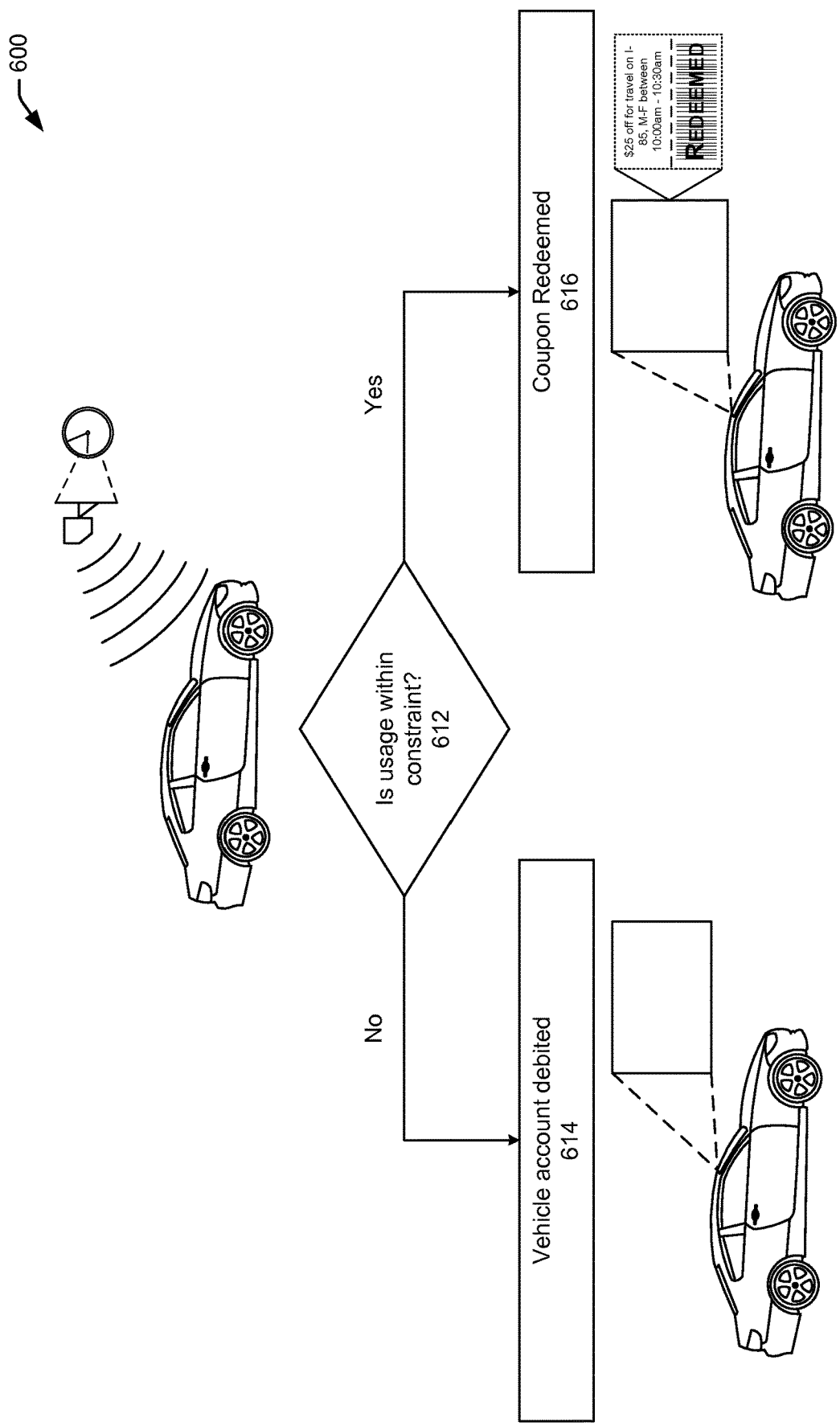

FIG. 6A-B is a flow diagram of an example method 600 for managing the purchase of an incentive offer by a user according to an embodiment of the disclosure. The method 600 illustrated in FIG. 6 may be an example implementation of block 410 shown in FIG. 4. As such, the method 600 may be performed by a suitable service provider computer and/or disposal module, such as the service provider computer 102. The method 600 may begin at block 602.

At operation block 602, a recommendation for incentive offers may be transmitted to a user on a user device 110. The one or more incentive offers may be communicated to the user device 110. The incentive offers may include a price and a transit point on the transportation grid. The incentive offer may be transmitted through the communications network to a user-device specific application. In other examples, the user may receiver a short-form message or an electronic mail message on an electronic mail or phone number associated with the user device 110. Incentive offer may be restricted to users travelling or located near a predefined area. Alternatively, the user may input preferences for receiving incentive offers to the service provider servers 102

At operation block 606, the service provider server 102 may receive a request to purchase an incentive offer. In other embodiments, the incentive offer may be purchased through a user device 110 such as a laptop computer, desktop computer, smartphone, tablet or an on-board vehicle computing system. In other instances the consumer can charge, load, or otherwise authorize the account with a pre-paid value for use in purchasing the offers. The purchase may be facilitated through the user of a credit card.

At operation block 608, the service provider server 102 may transmit the purchased offer in the form of a digital certificate for use through an electronic toll pass 300. In some embodiments, the service provider server 102 may transmit the certificate either remotely to the electronic toll pass 300 or through a VCS. The certificate may be downloaded onto the electronic toll pass module 300. In one embodiment, the certificate may be downloaded on a portable memory storage device such as a USB device. In other embodiments, the certificate may be transmitted to a electronic toll pass 300 by way of a vehicle communication device configured with long-range radio through a long-range radio signal such as a 3G.

At operation block 610, the service provider server 102 may receive the vehicle certificate at a transit point. The service provider server 102 may also receive the vehicle's travel time, date and other information at the transit point In one embodiment, the transit point may be configured with network connectivity. Further, the transit point may be equipped with a reader to scan the vehicle as it transports through the transit point.

At operation block 612, the service provider 102 may identify apply an incentive for each offer. The applied incentive may include: (i) a fixed monetary discount, (ii) a percentage discount, (iii) a fixed monetary increase; or (iv) a percentage penalty.

Each certificate or coupon associated with an offer may identify one or more use conditions associated with the offer. Further, the service provider server 102 may compare these conditions with data received from the transit point such as time of day, transit point coordinates. Using the data regarding the vehicle, with the conditions for use of the offer, the server may make a determination on whether the coupon may be used or redeemed for these electronic toll collections. If the coupon may be used or redeemed for this particular electronic tolls collections, the service provider servers 102 may use or redeem the coupon.

At operation 614, if in operation 610, the service provider server 102 has determined that the vehicle has not satisfied the use conditions, the service provider server 102 may apply non-incentive price In certain embodiments, the service provider server 102 may debit a prepaid account associated with the user 112, in other examples, the service provider server 102 may use a preauthorized credit card, or any other suitable payment system.

At operation 616, if the conditions are in accordance with the terms and conditions associated with the purchase offer with an applied incentive, the coupon may be redeemed or utilized. The redemption may be based on terms and redemption conditions associated with the coupon. In one example, if a coupon has a limit on the number of times a user may use the coupon, then the server device may track the total number of usage by the particular user. Other conditions may include an expiration date etc. In one use case example, an offer may be limited to 10 trips through a particular transit point. In this example, the services provider server 102 may track the number of times the vehicle has passed through the transit point. Once the vehicle has completed 10 trips, the coupon may be redeemed (therefore, the vehicle may not use the coupon for further trips)

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A method comprising:
retrieving, by a computer having at least one processor, a plurality of data files associated with historical transit data, the historical transit data comprising:
a radio-frequency identifier of a vehicle,
first transit data associated with a first mode of transportation, and
second transit data associated with a second mode of transportation different than the first mode of transportation;
determining, by the computer, at least one use-condition associated with a transit point and the vehicle based at least in part on the historical transit data;
determining, by the computer, a first commute time associated with the first mode of transportation;
determining, by the computer, a second commute time associated with the second mode of transportation, wherein the first commute time is less than the second commute time;
generating, by the computer, one or more offers for the vehicle based at least in part on the at least one use-condition, wherein:
a use-condition of the at least one use-condition is associated with a reduced commute time, and the reduced commute time corresponds to the first commute time;
determining, by the computer, based at least in part on the radio-frequency identifier, that the vehicle has previously traveled in a geographic area comprising the transit point;
generating, by the computer and based at least in part on the one or more offers, an encrypted digital certificate, wherein the encrypted digital certificate comprises a first identifier and a second identifier, the first identifier associated with authentication of the vehicle, wherein the first identifier uniquely identifies the vehicle, and wherein the second identifier is associated with the one or more offers;
upon generating the encrypted digital certificate, cause to send the encrypted digital certificate to an electronic toll pass; and
causing to send, by the computer, the one or more offers to a user device associated with the vehicle based at least in part on the determination that the vehicle has previously traveled in the geographic area.

2. The method of claim 1, wherein determining the at least one use-condition associated with a transit point further comprises determining an applied incentive associated with the one or more offers.

3. The method of claim 2, wherein the applied incentive further comprises of one of:
(i) a fixed monetary discount,
(ii) a percentage discount,
(iii) a fixed monetary increase; or
(iv) a percentage penalty.

4. The method of claim 1, wherein determining the at least one use-condition associated with a transit point further comprises determining a redemption period.

5. The method of claim 1, wherein determining the at least one use-condition associated with a transit point further comprises selecting the transit point based at least in part on analyzing the historical transit data.

6. The method of claim 5, wherein selecting a transit point further comprises:
identifying, by the computer, a first location associated with a first parameter indicative of traffic flow; and
selecting, by the computer, the transit point based at least in part on the first location, wherein the transit point is selected to achieve predetermined usage in comparison with the first location.

7. The method of claim 1, wherein the at least one use-condition includes one or more of the following:
reducing vehicle traffic at the transit point;
routing vehicle traffic from a first location to the transit point;
reducing vehicle traffic at a given time; or
reducing vehicle traffic in a given area.

8. The method of claim 1, wherein generating the one or more offers for the vehicle comprises selecting a cap value for the one or more offers, wherein the cap value is a limit on a total number of offers distributed.

9. The method of claim 1, wherein causing to send the one or more offers to the user device further comprises transmitting the one or more offers to a user interface.

10. The method of claim 1, further comprising managing a purchase of a first offer of the one or more offers from a user of the user device.

11. The method of claim 10, further comprising receiving information associated with a purchase of the first offer, wherein the information identifies a user account associated with the vehicle.

12. The method of claim 1, wherein the digital certificate indicates a vehicle identification number of the vehicle.

13. The method of claim 1, further comprising conditioning the activation of the certificate based at least in part upon receiving a vehicle identification associated with the vehicle.

14. The method of claim 1, further comprising:
determining that the vehicle is associated with a purchase of an electronic toll pass; and
transmitting a configuration to the user device indicating the electronic toll pass.

15. The method of claim 8, further comprising:
receiving data indicating transit of the vehicle approximate to the transit point;
identifying a user account associated with the vehicle;
redeeming a coupon if the transit of the vehicle occurred within a redemption period; and
debiting the user account if the transit of the vehicle did not occur within the redemption period.

16. A system comprising:
at least one memory including computer-executable instructions;
at least one communications interface; and
at least one processor in communication with the at least one communications interface and the at least one memory and configured to pair with and execute the computer-executable instructions to:
retrieve a plurality of data files associated with historical transit data, the historical transit data comprising:
a radio-frequency identifier of a vehicle,
first transit data associated with a first mode of transportation, and
second transit data associated with a second mode of transportation different than the first mode of transportation;
determine at least one use-condition associated with a transit point based at least in part on the historical transit data;
determine a first commute time associated with the first mode of transportation;
determine a second commute time associated with the second mode of transportation, wherein the first commute time is less than the second commute time;

generate one or more offers for a vehicle based at least in part on the at least one use-condition, wherein:
a use-condition of the at least one use-condition is associated with a reduced commute time, and the reduced commute time corresponds to the first commute time;
determine, based at least in part on the radio-frequency identifier, that a vehicle has previously traveled in a geographic area comprising the transit point;
generate based at least in part on the one or more offers of an encrypted digital certificate, wherein the encrypted digital certificate comprises a first identifier and a second identifier, the first identifier associated with authentication of the vehicle, wherein the first identifier uniquely identifies the vehicle, and wherein the second identifier is associated with the one or more offers;
upon generating the encrypted digital certificate, cause to send the encrypted digital certificate to an electronic toll pass; and
cause to send the one or more offers to a user device associated with the vehicle based at least in part on the determination that the vehicle has previously traveled in the geographic area.

17. The system of claim 16, wherein the at least one processor is further configured to execute the computer-executable instructions to determine an applied incentive associated with the one or more offers.

18. The system of claim 17, wherein the applied incentive comprises one of (i) a fixed monetary discount, (ii) a percentage discount, (iii) a fixed monetary penalty, or (iv) a percentage increase.

19. The system of claim 16, wherein the at least one use-condition comprises selecting the transit point based at least in part on analyzing the historical transit data.

20. The system of claim 16, wherein the at least one processor is further configured to execute the computer-executable instructions to:
identify a first location associated with a first parameter indicative of traffic flow; and
select the transit point based at least in part on the first location, wherein the transit point is selected to achieve predetermined usage in comparison with the first location.

21. The system of claim 16, wherein the at least one use-condition further comprises one of the following:
(i) reducing vehicle traffic at the transit point;
(ii) routing vehicle traffic from a first location to the transit point;
(iii) reducing vehicle traffic at a given time; or
(iv) reducing vehicle traffic in a given area.

22. The system of claim 16, wherein the use-condition further includes: to select a cap value, wherein the cap value is a limit on a total number of the one or more offers generated.

23. The system of claim 16, wherein to cause to send the one or more offers further comprises to transmit the one or more offers to a user-interface.

24. The system of claim 16, wherein the at least one processor is further configured to execute the computer-executable instructions to manage a purchase of a first offer of the one or more offers from a user of the user device.

25. The system of claim 24, wherein the at least one processor is further configured to execute the computer-executable instructions to:
receive information associated with a purchase of the first offer, wherein the information identifies a user account associated with the vehicle.

* * * * *